(12) United States Patent
Fischer

(10) Patent No.: US 6,417,795 B1
(45) Date of Patent: Jul. 9, 2002

(54) METHOD OF REDUCING BACKSCATTER THROUGH OBJECT SHAPING USING THE CALCULUS OF VARIATIONS

(75) Inventor: Brian E. Fischer, Manchester, MI (US)

(73) Assignee: Veridian ERIM International, Inc., Ann Arbor, MI (US)

(*) Notice: Subject to any disclaimer, the term of this patent is extended or adjusted under 35 U.S.C. 154(b) by 0 days.

(21) Appl. No.: 09/656,676

(22) Filed: Sep. 7, 2000

Related U.S. Application Data

(60) Provisional application No. 60/152,687, filed on Sep. 7, 1999.

(51) Int. Cl.[7] .............................................. H01Q 17/00
(52) U.S. Cl. ...................... 342/4; 342/1; 342/2; 342/5; 342/13
(58) Field of Search ................................ 342/1–13, 89, 342/90

(56) References Cited

U.S. PATENT DOCUMENTS 5,381,154 A * 1/1995 Guerci ........................ 342/90
5,717,397 A    2/1998 Ruszkowski, Jr. ............ 342/2

* cited by examiner

*Primary Examiner*—Bernarr E. Gregory
(74) *Attorney, Agent, or Firm*—Gifford, Krass, Groh, Sprinkle, Anderson & Citkowski, PC

(57) ABSTRACT

Variational calculus principles are applied directly to the radiation integral to minimize the radar signature of a two- or three-dimensional geometry. In the preferred embodiment, the radiation integral is minimized through the solution to a differential equation generated by Euler's calculus of variations (CoV) equation. When used in conjunction with a minimizing sequence, the analysis affords a broad search of all possible coefficient values to ultimately arrive at global minima. Compared to existing techniques, the approach locates local extrema quickly and accurately using fewer impedance matrix calculations, and optimization using the invention is possible over a wide band of frequencies and angles. The method is applicable to a wide variety of situations, including the design of stealth platforms.

9 Claims, 14 Drawing Sheets

METHOD OF REDUCING BACKSCATTER THROUGH OBJECT SHAPING USING THE CALCULUS OF VARIATIONS

REFERENCE TO RELATED APPLICATION

This application claims priority from U.S. provisional application Ser. No. 60/152,687, filed Sep. 7, 1999, the entire contents of which are incorporated herein by reference.

FIELD OF THE INVENTION

This invention relates generally to radar signature and, in particular, to a method of reducing radar cross-section and/or echo length.

BACKGROUND OF THE INVENTION

The use of radar is now widespread, for both commercial and military uses. In military applications, particularly during times of war, it may be essential that a vehicle such as an aircraft go undetected.

The radar signature or "cross-section" of an object is a measure of how much radar energy is reflected back or "returned" to a source or system searching for the object. The greater the signature, the easier it is to detect, track and potentially direct weapon systems against that object.

Radar cross section is also a function of the direction from which an object is "viewed." With regard to aircraft, reduced aircraft radar cross-section is most important when viewed from the front, or in the "frontal sector." Radar cross section is also typically increased in the presence of externally supported appendages such as weapons, which are typically mounted on pylons or against the body of the aircraft.

There are several techniques that may be employed to minimize the radar cross section. Broadly, one class of techniques is used to design aircraft having an inherently low radar signature, whereas other approaches seek to modify existing aircraft to achieve this same purpose. Of course, both broad principles may be applied to the same structure.

As discussed in U.S. Pat. No. 5,717,397, radar cross-section may be minimized using any combination of the following:

1. Shaping the exterior of the aircraft or external features, including leading/trailing edges, gaps, and seams, such that radar energy is reflected away from potential enemy radars;
2. Aligning leading and trailing edges, gaps and seams at a minimum number of similar angles (especially in the top or "plan" view of the aircraft), such that the radar returns from these various features are concentrated into fewer angles or sectors.
3. Concealing or hiding highly radar reflective aircraft components from the "view" of potential enemy radars; and
4. Utilizing materials and coatings in the construction of aircraft components that absorb or diffuse radar energy.

Whether designing a craft for a low radar signature in the first place, or modifying existing craft to achieve a reduced cross. section, the problem is complex and often mathematically intensive. Cross-section optimization using manual and empirical methods is labor intensive and, although computer methods may be employed to find local minima, global optimization is often elusive. Current automated techniques use Z-matrix calculations, often requiring numerous iterations to achieve dubious results. Although such techniques have improved in recent years, existing methods often still require mechanisms to avoid stagnating in local minima.

SUMMARY OF THE INVENTION

Broadly, this invention applies variational calculus principles directly to the radiation integral to minimize radar cross-section and/or echo length. The radiation integral, which is well known to those of skill in antenna design and other disciplines, may be used to determine the electromagnetic field scattering of a body given the surface current. In the preferred embodiment of this invention, the radiation integral is minimized through the solution to a differential equation generated by Euler's calculus of variations (CoV) equation. When used in conjunction with a minimizing sequence, the analysis affords a broad search of all possible coefficient values to ultimately arrive at. global minima.

Compared to existing techniques, the approach locates local extrema quickly and accurately using fewer impedance matrix calculations. The method is applicable to a wide variety of situations, including the design of stealth platforms. A thorough analysis of the applicable design equations is disclosed, which indicate that optimization over a wide band of frequencies and angles is possible. Although the examples presented are in two dimensions, the procedure is readily extensible to three dimensions.

BRIEF DESCRIPTION OF THE INVENTION

Figure 6A:
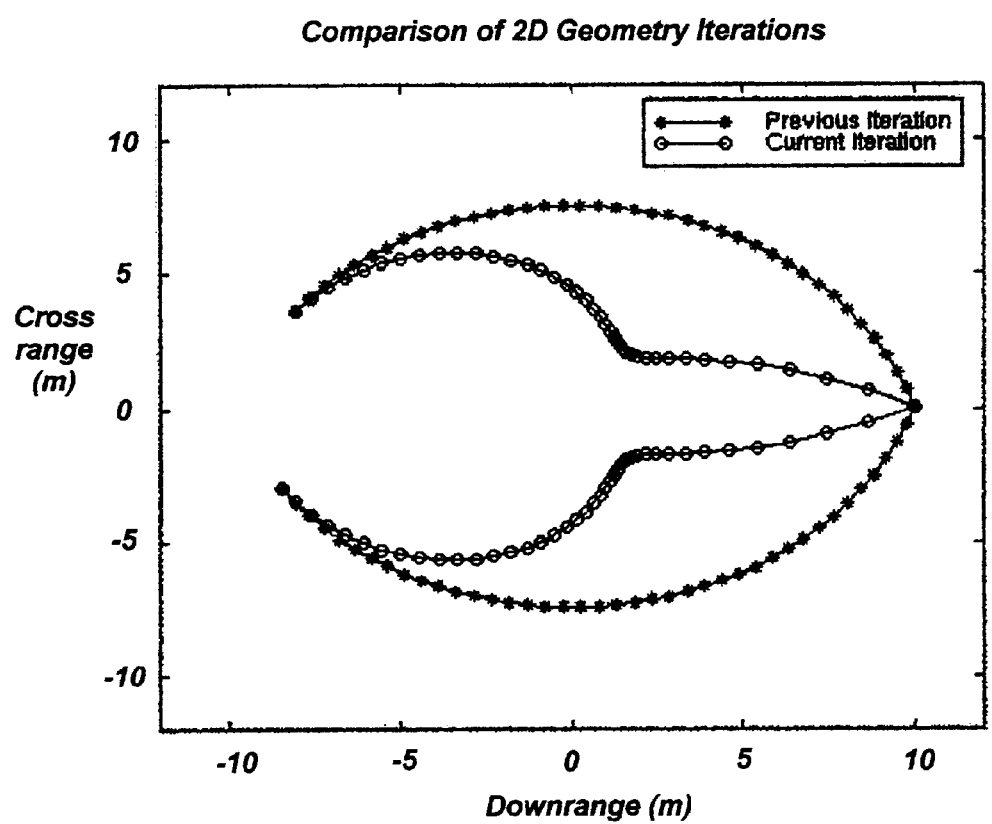
Figure 6B:
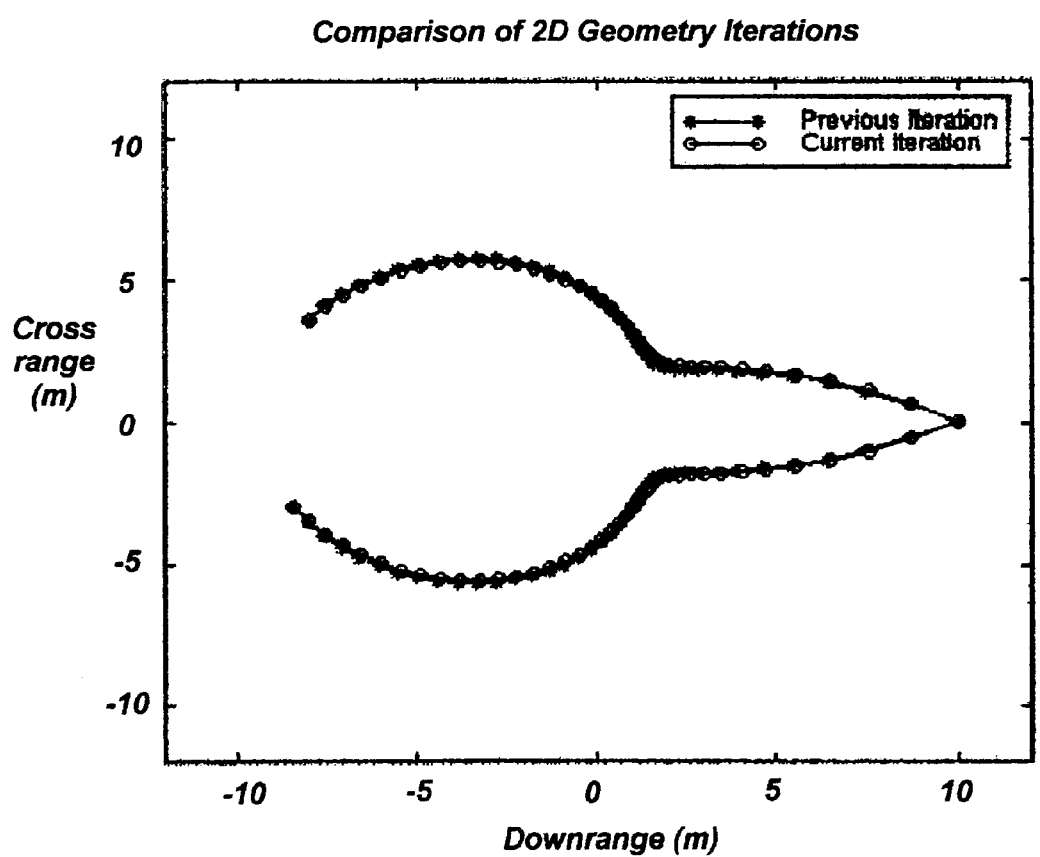
Figure 6C:
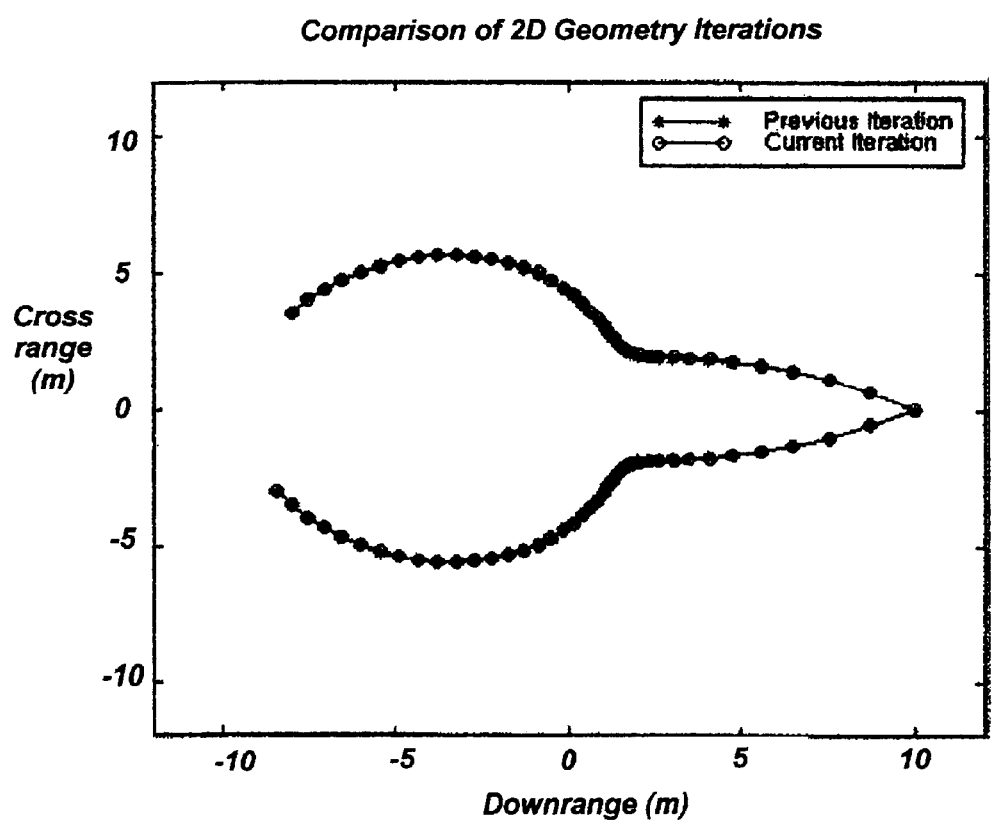
Figure 7A:
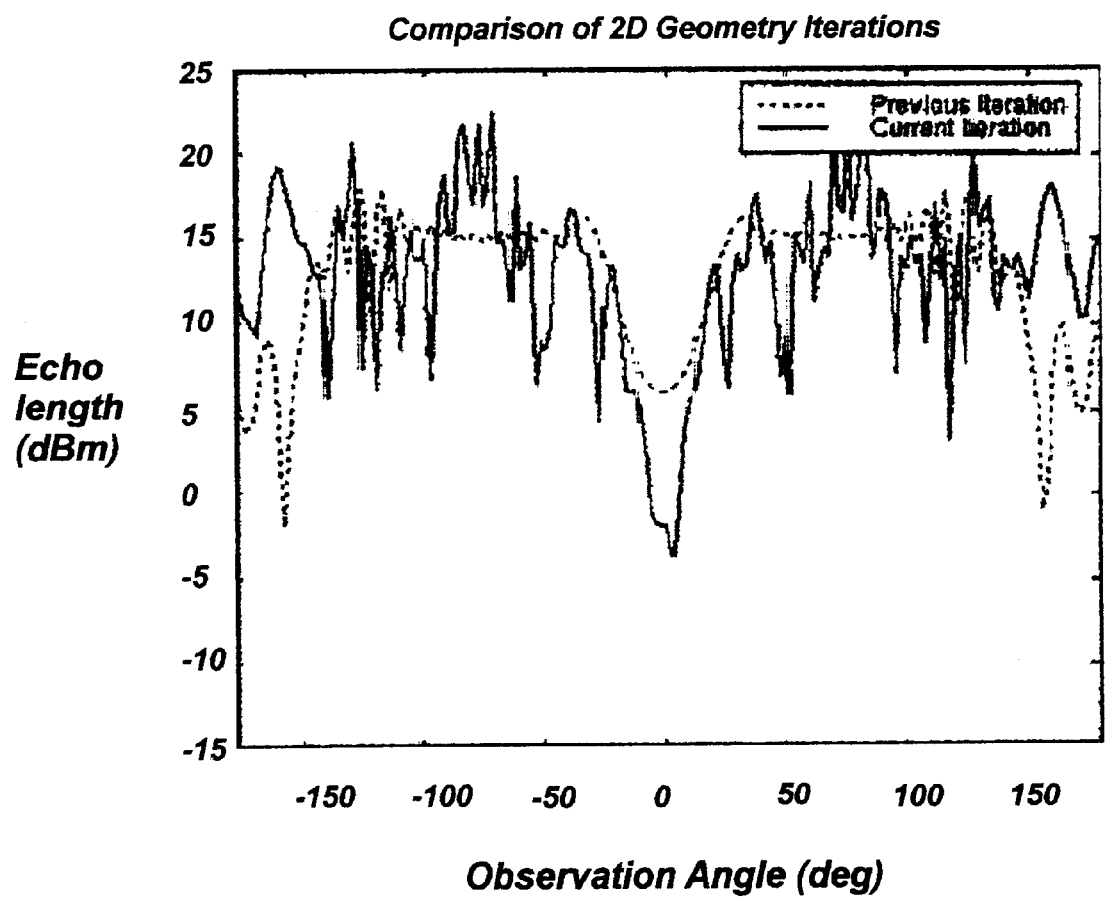
Figure 7B:
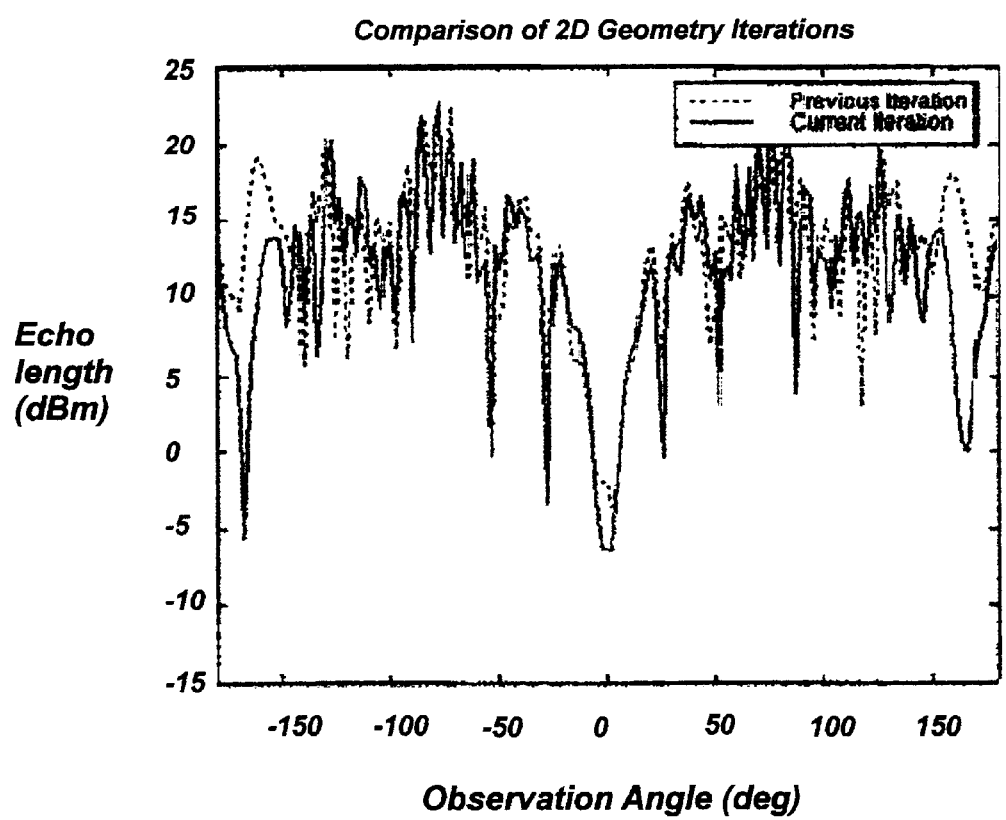
Figure 7C:
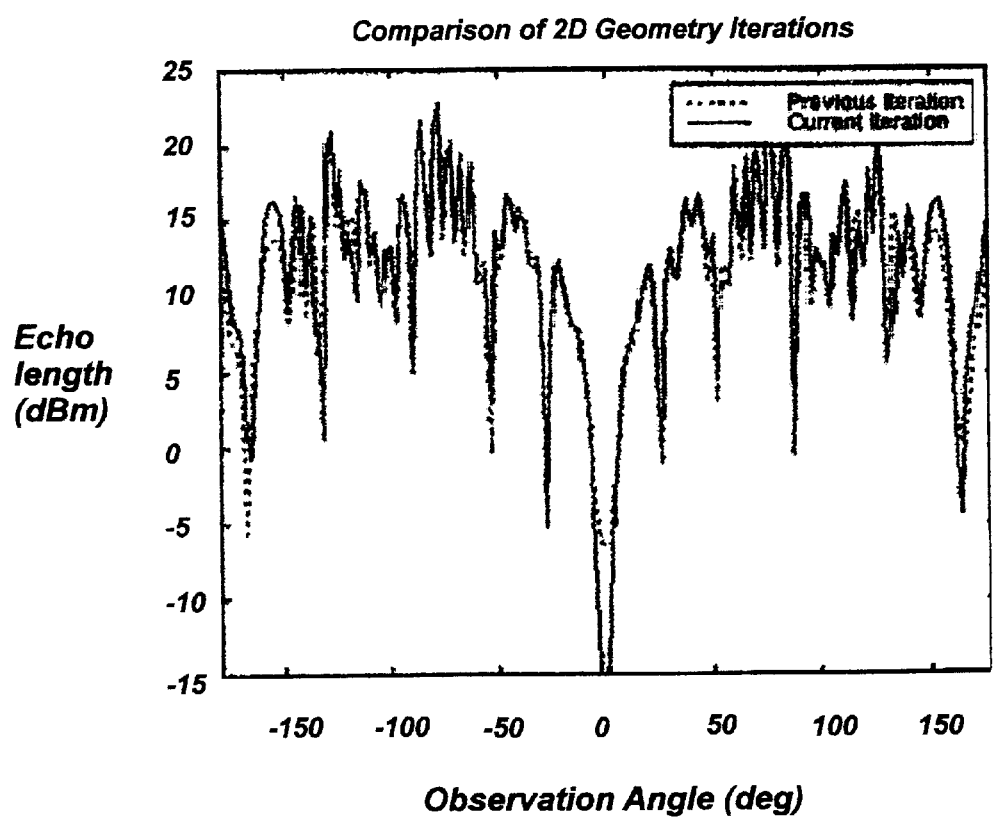

FIGS. 6a through 6c illustrate the way in which a two-dimensional shape is iteratively optimized according to the invention using polar domain processing; and FIGS. 7a through 7c depict echo length corresponding to the optimizations of FIGS. 6a through 6c.

DETAILED DESCRIPTION OF THE INVENTION

This invention exploits Euler's equation to locate local extrema quickly and accurately. When used in conjunction with a minimizing sequence, the analysis affords a broad search of all possible coefficient values to ultimately arrive at the global minimum.

Introduction to the Design Equations

The analysis begins with the well-known radiation integral in two dimensions [3] given by:

$$E_z^s(\bar{p}) = \frac{\omega \mu_0}{4} \int_s J_z^s(\bar{p}') H_0^{(2)}(k|\bar{p} - \bar{p}'|) dl, \quad (1)$$

Figure 1:
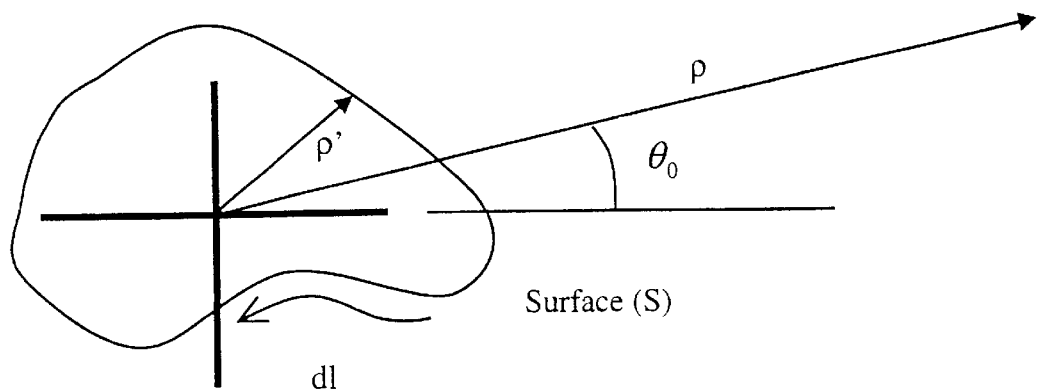
FIG. 1 is a drawing of a geometry used to illustrate the principles of the invention.

-continued $E_z^s(\bar{\rho}) \equiv TM_z$ radiated field $(m^{-1}V)$ $J_z^s(\bar{\rho}') \equiv z$ – directed surface current $(m^{-1}A)$ $\omega \equiv$ angular frequency $(s^{-1}\text{rad})$ $k \equiv$ wave number $(m^{-1})$ $\mu_0 \equiv$ permittivity of free space $(m^{-1}H)$ $\bar{\rho}' \equiv$ vector from origin to geometry surface $(m)$ $\bar{\rho} \equiv$ vector from origin to observation point $(m)$ The geometry in question is depicted in FIG. 1.

Introduction to the Calculus of Variations

If a two-dimensional integral equation can be constructed of the form $$M[y] = \int_a^b F(x, y, \dot{y})\,dx, \tag{2}$$

then it can be shown that the differential equation, $$F_y - \frac{d}{dx}F_{\dot{y}} = 0, \tag{3}$$

when solved for y, will ensure that M[y] is a relative extrema. When the equation approaches zero, it ensures that a maximizing or minimizing solution is being obtained in an optimum sense.

As an example, consider a simplified form of problem that can arise when charged particles travel in an electromagnetic field or near a line charge:

$$M[y] = \int_{x_1}^{x_2} \frac{\sqrt{1+\dot{y}^2}}{y}\,dx, \tag{4}$$

where M[y] represents energy. Fundamental laws of physics dictate that charged particles will seek the path requiring the minimum amount of energy to traverse. The problem is to determine what that path may be, and this lends itself directly to a CoV solution. Here, $$F_y = -\frac{\sqrt{1+\dot{y}^2}}{y^2}, \tag{5}$$

$$F_{\dot{y}} = \frac{\dot{y}}{y\sqrt{1+\dot{y}^2}}, \text{ such that} \tag{6}$$

-continued $$\frac{d}{dx}F_{\dot{y}} = \frac{\ddot{y}y\sqrt{1+\dot{y}^2} - \dot{y}\left(\dot{y}\sqrt{1+\dot{y}^2} + y\dot{y}\ddot{y}/\sqrt{1+\dot{y}^2}\right)}{\left(y\sqrt{1+\dot{y}^2}\right)^2}, \text{ and} \tag{7}$$

$$F_y - \frac{d}{dx}F_{\dot{y}} = -\frac{\sqrt{1+\dot{y}^2}\left(\sqrt{1+\dot{y}^2}\right)^2}{y^2\left(\sqrt{1+\dot{y}^2}\right)^2} - \tag{8}$$

$$\frac{\ddot{y}y\sqrt{1+\dot{y}^2} - \dot{y}\left(\dot{y}\sqrt{1+\dot{y}^2} + y\dot{y}\ddot{y}/\sqrt{1+\dot{y}^2}\right)}{\left(y\sqrt{1+\dot{y}^2}\right)^2}.$$

$$= 0$$

This reduces ultimately to $$\ddot{y}y + \dot{y}^2 + 1 = 0. \tag{9}$$

Solving for this differential equation produces as a solution, $$(x-C_1)^2 + y^2 = C_2^2, \tag{10}$$

an offset circular arc. The constants depend on the choices of $x_1$, $x_2$, $y(x_1)$ and $y(x_2)$.

Construction of the Design Equations

According to the invention, equation (1) is placed into a format amenable to the solution of the Euler equation.

Cartesian Format Design Equations

Figure 2:
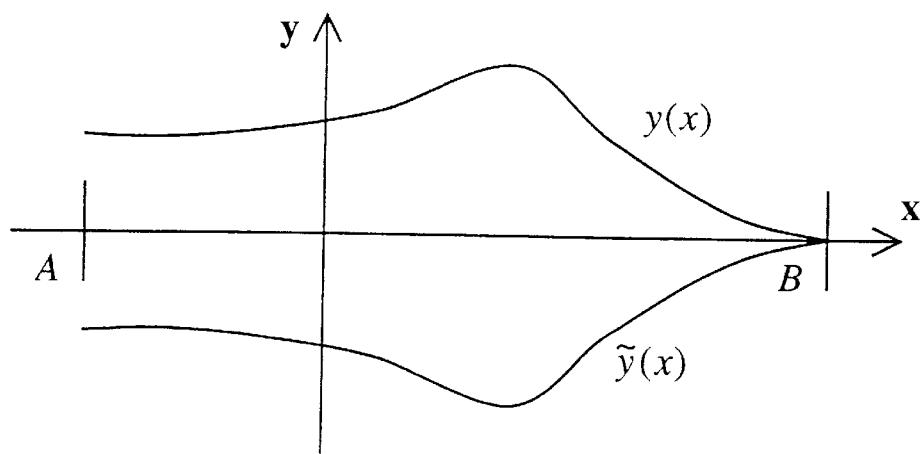
FIG. 2 is a drawing of a two-dimensional geometry defined by a single, continuous variable.

Assume that a two-dimensional geometry can be defined by a single continuous variable, y(x). If this is the case, the entire geometry may be defined according to curves of FIG. 2. For this geometry, it is assumed that the two curves [y(x), $\tilde{y}$(x)] must meet at some common point (in this case, B, where both are zero). As a common point for optimization problems involving minimization, this is a judicious choice because we will assume that the primary minimization should occur about $\theta=0$. Note that $\tilde{y}$(x) appears to depend on y(x) in the sense that it is of the opposite sign. Although this is not required under the invention, for convenience this assumption will be used in the following calculations.

We begin by recasting the radiation integral of equation (1) into a more amenable format for the application of the Euler equation:

$$E_z^s(\rho) = \frac{\omega\mu_0}{4}\int_A^B J_z^s\left[\sqrt{x^2+y^2(x)}\right]H_0^{(2)}(k[\rho-x\cos\theta_0-y(x)\sin\theta_0])\sqrt{1+\dot{y}^2(x)}\,dx + \tag{11}$$

$$\frac{\omega\mu_0}{4}\int_A^B \tilde{J}_z^s\left[\sqrt{x^2+\tilde{y}^2(x)}\right]H_0^{(2)}(k[\rho-x\cos\theta_0-\tilde{y}(x)\sin\theta_0])\sqrt{1+\dot{\tilde{y}}^2(x)}\,dx,$$

where $$\dot{y}(x) = \frac{d}{dx}y(x),$$

$\theta_0$ is the angle of observation, $\rho \to \infty$, and [A,B] is the range over x on the surface represented by the symmetric geometry above. From here on, the notation y(x) will be dropped in favor of y.

Using this new equation, now we can begin to consolidate the nomenclature. First, incorporate the large argument approximation for the Hankel function $$H_0^{(2)}(k[\rho - X]) \cong \sqrt{\frac{2j}{k\pi[\rho - X]}} \exp[-jk[\rho - X]], \quad (12)$$

for $\rho \to \infty$, and $X = x\cos\theta_0 + y\sin\theta_0$.

Equation (12) can be further reduced according to $$\sqrt{\frac{2j}{k\pi[\rho - X]}} \exp[-jk[\rho - X]] \xrightarrow{\lim} \sqrt{\frac{2j}{k\pi\rho}} \exp[-jk\rho]\exp[jkX]. \quad (13)$$

Next, write $$E_z^s(\rho) = M[y] = k_0 \int_s F(x, y, \dot{y}) dx, \quad (14)$$

and for convenience write, $$F(x,y,\dot{y}) = J_z^s(x,y) A(x) B(x,y) C(x,\dot{y}), \text{ where} \quad (15)$$

$$k_0 \equiv \frac{\omega\mu_0}{2}\sqrt{\frac{2j}{k\pi\rho}} \exp[-jk\rho]$$

$A(x) \equiv \exp[jkx \cos\theta_0]$
$B(x,y) \equiv \exp[jky \sin\theta_0]$ $$C(x,\dot{y}) \equiv \sqrt{1 + \dot{y}^2}$$

The optimization can now be more compactly described. Begin by finding $$F_y = (J_z^s)_y ABC + J_z^s AB_y C \text{ and} \quad (16)$$

$F_{\dot{y}} = J_z^s ABC_{\dot{y}}$, such that $$\frac{d}{dx}F_{\dot{y}} = ABC_{\dot{y}}\frac{d}{dx}J_z^s + J_z^s BC_{\dot{y}}\frac{d}{dx}A + J_z^s AC_{\dot{y}}\frac{d}{dx}B + J_z^s AB\frac{d}{dx}C_{\dot{y}}.$$

Now calculate, $$(J_z^s)_y = \frac{y}{r}\frac{\partial}{\partial r}J_z^s(r), \text{ where} \quad (17)$$

$r = \sqrt{x^2 + y^2}$, and $\quad (18)$ $B_y = jk \sin\theta_0 \exp[jky \sin\theta_0] = jk \sin\theta_0 B$, such that $\quad (19)$ $$F_y = \frac{AB}{C}\left(C^2\frac{y}{r}\frac{\partial}{\partial r}J_z^s + jkC^2\sin\theta_0 J_z^s\right). \quad (20)$$

In a similar fashion, it is straightforward to calculate, $$\frac{d}{dx}J_z^s = \frac{x + y\dot{y}}{r}\frac{\partial}{\partial r}J_z^s, \quad (21)$$

$$\frac{d}{dx}A = jk\cos\theta_0\exp[jkx\cos\theta_0] = jk\cos\theta_0 A, \text{ and} \quad (22)$$

$$\frac{d}{dx}B = jk\dot{y}\sin\theta_0\exp[jky\sin\theta_0] = jk\dot{y}\sin\theta_0 B, \text{ and} \quad (23)$$

-continued $$C_{\dot{y}} = \frac{\dot{y}}{\sqrt{1 + \dot{y}^2}} = \frac{\dot{y}}{C}, \text{ such that} \quad (24)$$

$$\frac{d}{dx}C_{\dot{y}} = \frac{\ddot{y}}{C^3}, \text{ and} \quad (25)$$

$$\frac{d}{dx}F_{\dot{y}} = \frac{AB}{C}\left(\dot{y}\frac{x + y\dot{y}}{r}\frac{\partial}{\partial r}J_z^s + jk\dot{y}\cos\theta_0 J_z^s + jk\dot{y}^2\sin\theta_0 J_z^s + J_z^s\frac{\ddot{y}}{C^2}\right).$$

At this point, the Euler equation can now be calculated as $$F_y - \frac{d}{dx}F_{\dot{y}} = \frac{AB}{C}\left(\frac{y - x\dot{y}}{r}\frac{\partial}{\partial r}J_z^s + J_z^s\left[\frac{-\ddot{y}}{1 + \dot{y}^2} + jk\sin\theta_0 - jk\dot{y}\cos\theta_0\right]\right). \quad (26)$$

Finally, the design equation for minimization reduces to $$\left|D\frac{\partial}{\partial r}J_z^s + (jE + F)J_z^s\right| \to 0, \text{ for} \quad (27)$$

$$D = \frac{y - x\dot{y}}{r}, \text{ and}$$

$E = k[\sin\theta_0 - \dot{y}\cos\theta_0]$, and $$F = \frac{-\ddot{y}}{1 + \dot{y}^2}.$$

We may want to choose to allow the aft end of the geometry to have freedom of movement in some cases. To allow this, require [1]

$$F_{\dot{y}}|_A{}^B = J_z^s ABC_{\dot{y}}|_A{}^B = 0. \quad (28)$$

Using previous calculations, this forces the condition $$\dot{y}(A) = \dot{y}(B). \quad (29)$$

The relevance of these assignments will become apparent shortly.

It should be apparent that the current ($J_z^s$) is not a priori information in the MoM calculation. This implementation thus requires some form of iteration. The advantage of this technique versus techniques seeking a similar end is that the optimization relationship is directly between the surface current and shape. As such, optimization may be attained without performing costly impedance matrix calculations for each iteration, so long as the shape solution does not change so radically as to significantly change the initialization current, thus invalidating the solution. The iteration thus requires some control scheme.

Construction of a Minimizing Sequence

Akhiezer (at p. 143) demonstrates a reasonable method devised by V. Ritz for the construction of a minimizing sequence. This sequence has enjoyed success in a variety of engineering applications [1]. Salient features of what are contained in the text are revisited here.

Start again with the functional formula of equation (2), subject to the conditions $$y(A) = a_1, y(B) = b_1. \quad (30)$$

Assume that the functional argument, $f(x,y,\dot{y})$, is continuous in all its arguments and assume further that the function can be bounded such that $$f(x,y,\dot{y}) \geq \alpha|\dot{y}|^p + \beta. \quad (31)$$

for $\alpha > 0$, $\beta$, $p > 1$. It is shown in Akhiezer [1] that these conditions guarantee the existence of a minimizing sequence when combined with a judicious choice of basis functions. Further, and more importantly, this condition guarantees a limit on the bounds of the minimization coefficients. This is extremely significant since no other RCS minimization approach can guarantee that its results can contain the solution to a global minimum considering the infinite possible combinations of series coefficients.

The series and basis functions are constructed according to the following conditions:

a. $\phi_0(A) = a_1$, $\phi_0(B) = b_1$
b. $\phi_k(A) = \phi_k(B) = 0$ ($k = 1, 2, 3, \ldots$)
c. $\phi_0(x)$ lies in the region defined by equation (31) with the possible exception of its endpoints
d. basis function first derivatives are linearly independent Based on these conditions, the basis functions chosen for this work were $$\phi_0(x) = a_1 + \frac{b_1 - a_1}{B - A}(x - a), \tag{32}$$

and $$\phi_k(x) = (x - A)^k (x - B)$$

for $$k > 0.$$

Not only does this choice of basis functions satisfy conditions a–d above, but the condition of equation (29) is satisfied as well (as a simple examination can show). Now if the series coefficients are chosen such that $$y_n(x) = \phi_0(x) + C_1 \phi_1(x) + C_2 \phi_2(x) + C_3 \phi_3(x) + \ldots + C_n \phi_n(x), \tag{33}$$

then the original function equation (2) is adequately represented by $$M[y_n] = \Phi(C_1, C_2, C_3, \ldots C_n) = \Phi(\overline{C}). \tag{34}$$

Since this is the case, we can assume that the only valuable solutions after an initial trial, where $\Phi(\overline{C}) = M$, are those that subsequently have a solution, $\Phi(\overline{C}) \leq M$.

The analysis thus proceeds starting with the reorganization of equation (31) leading to $$\int_A^B \left| \phi_0(x) + \sum_{i=1}^n C_i \phi_i(x) \right|^p dx \leq \frac{M - \beta(B - A)}{\alpha} = M_1, \tag{35}$$

and thus $$\left\{ \int_A^B \left| \sum_{i=1}^n C_i \phi_i(x) \right|^p dx \right\}^{1/p} \leq M_1^{1/p} + \left\{ \int_A^B |\phi_0(x)|^p dx \right\}^{1/p} = M_2. \tag{36}$$

Now the left side of the above equation can be put into the form $$\sqrt{C_1^2 + C_2^2 + C_3^2 + \ldots + C_n^2} \left\{ \int_A^B \left| \sum_{i=1}^n K_i \phi_i(x) \right|^p dx \right\}^{1/p}, \text{ where} \tag{37}$$

$$K_i = \frac{C_i}{\sqrt{C_1^2 + C_2^2 + C_3^2 + \ldots + C_n^2}}, \text{ and it's easy to see that} \tag{38}$$

-continued $$\sum_{i=1}^n K_i^2 = 1. \tag{39}$$

Because of this final convenient condition, the function $$\left\{ \int_A^B \left| \sum_{i=1}^n K_i \phi_i(x) \right|^p dx \right\}^{1/p} \tag{40}$$

is continuous on the unit circle and, according to a Weierstrass theorem, assumes a minimum value of $\delta$ on it. All of this leads to the final significant condition $$\sqrt{C_1^2 + C_2^2 + C_3^2 + \ldots + C_n^2} \leq \frac{M_2}{\delta}. \tag{41}$$

Ergo, the coefficients used to construct the geometry for RCS minimization have an upper bound on their combined value.

For this work, values of $p = 2$ and $\beta = 0$ were used for the inequality. The coefficient, $\alpha$, was computed using a Total Least Squares (TLS) technique combined with the computation of the functional integrand and $\dot{y}$. This does not guarantee a bound which will only contain minimization solutions, but rather approximates that bound.

Figure 3:
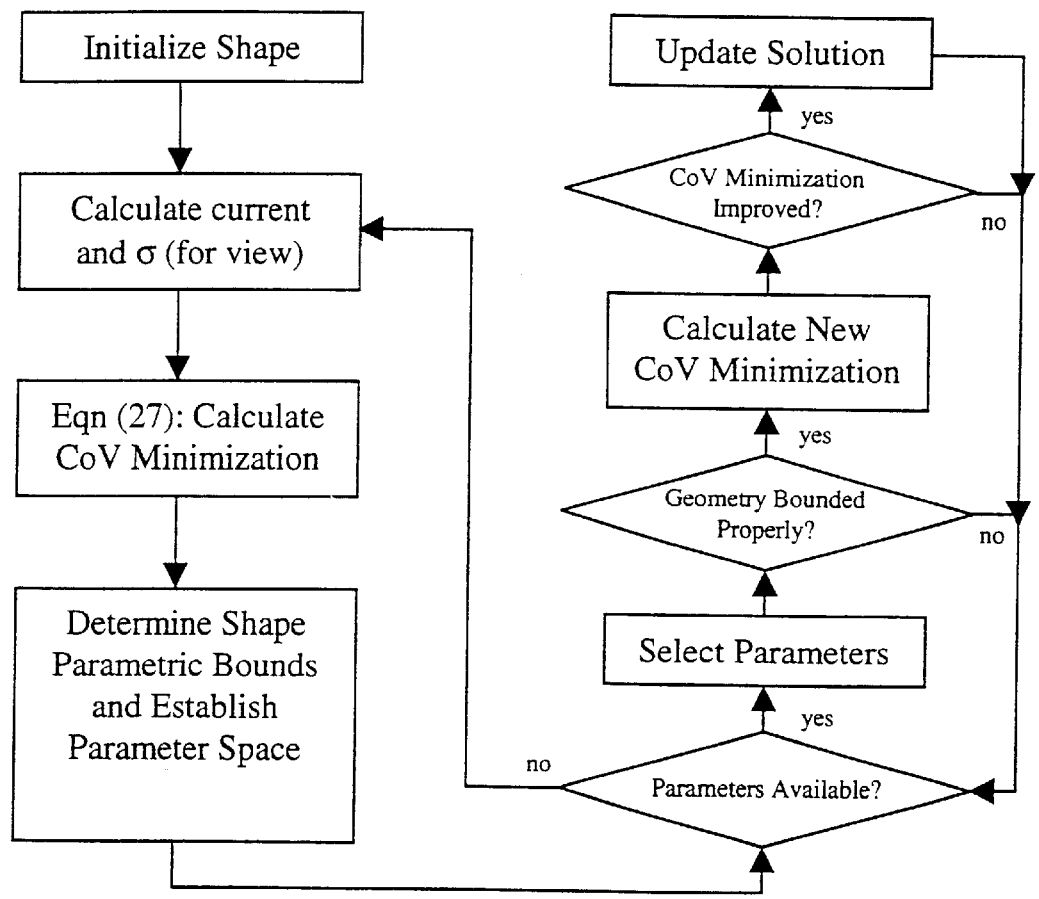
FIG. 3 is a block diagram of an iterative optimization process according to the invention.
Figure 4A:
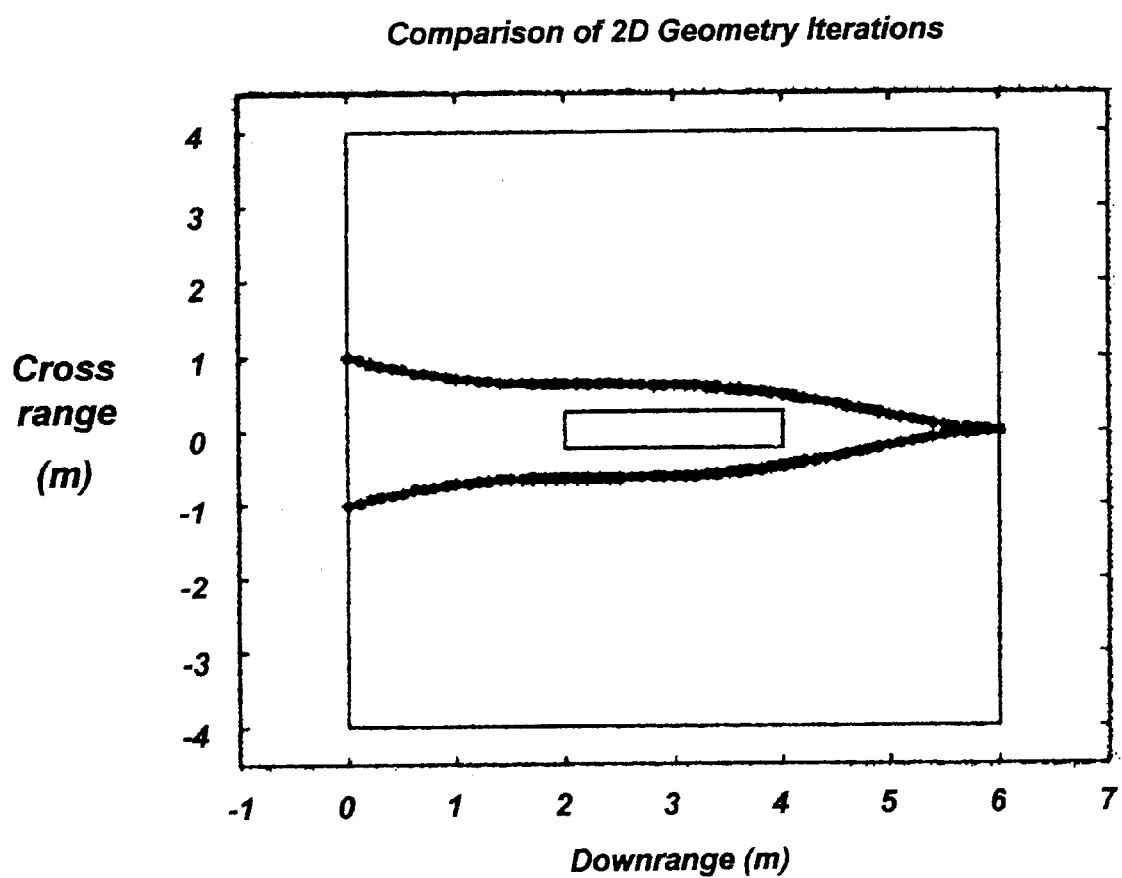
FIGS. 4a through 4c illustrate the way in which a two-dimensional shape is iteratively optimized according to the invention.
Figure 4B:
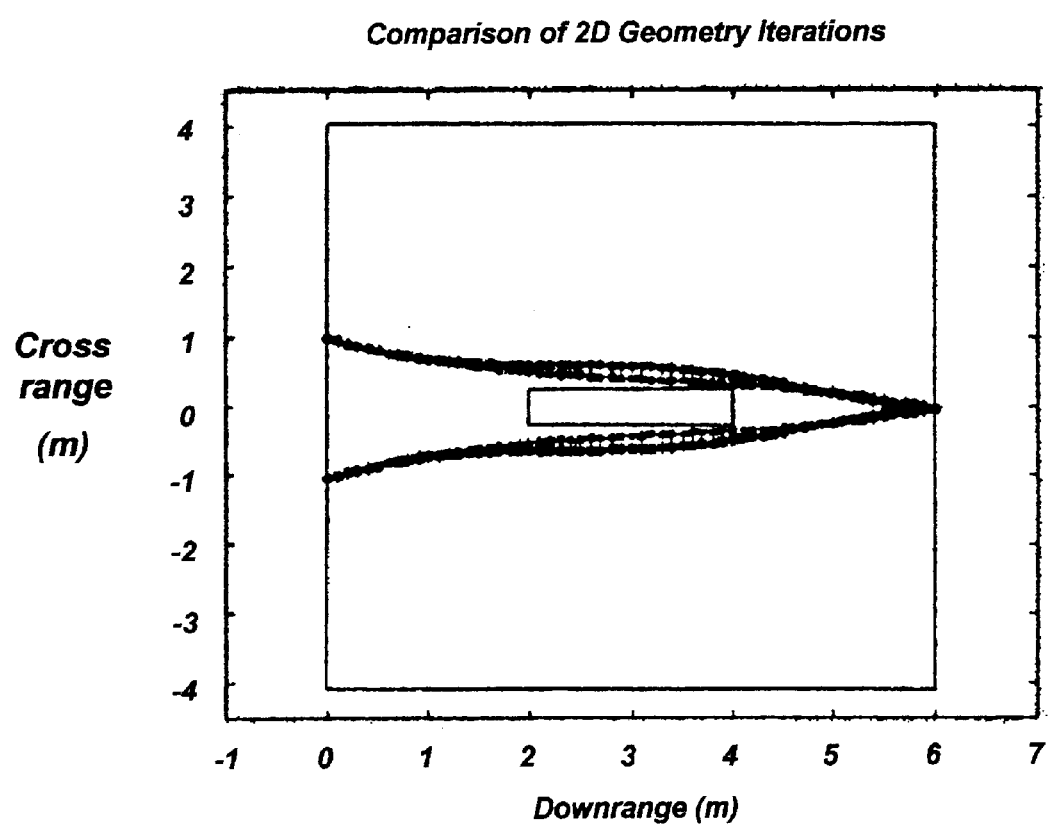
Figure 4C:
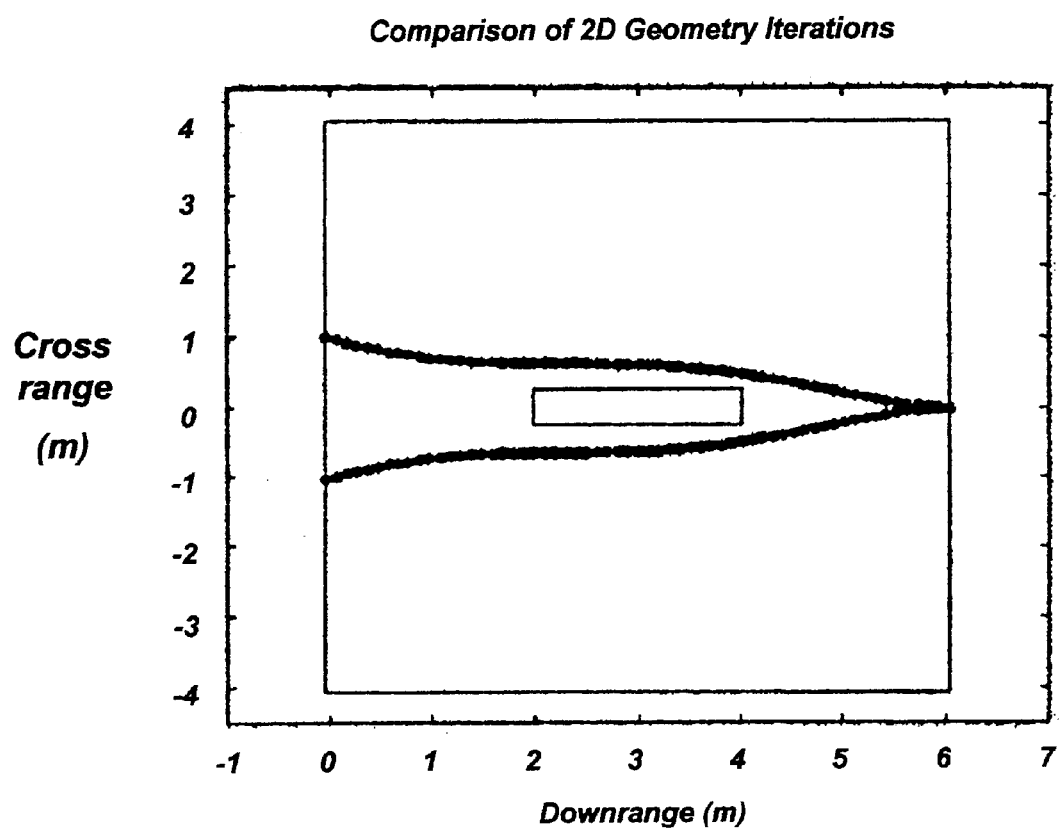
Figure 5A:
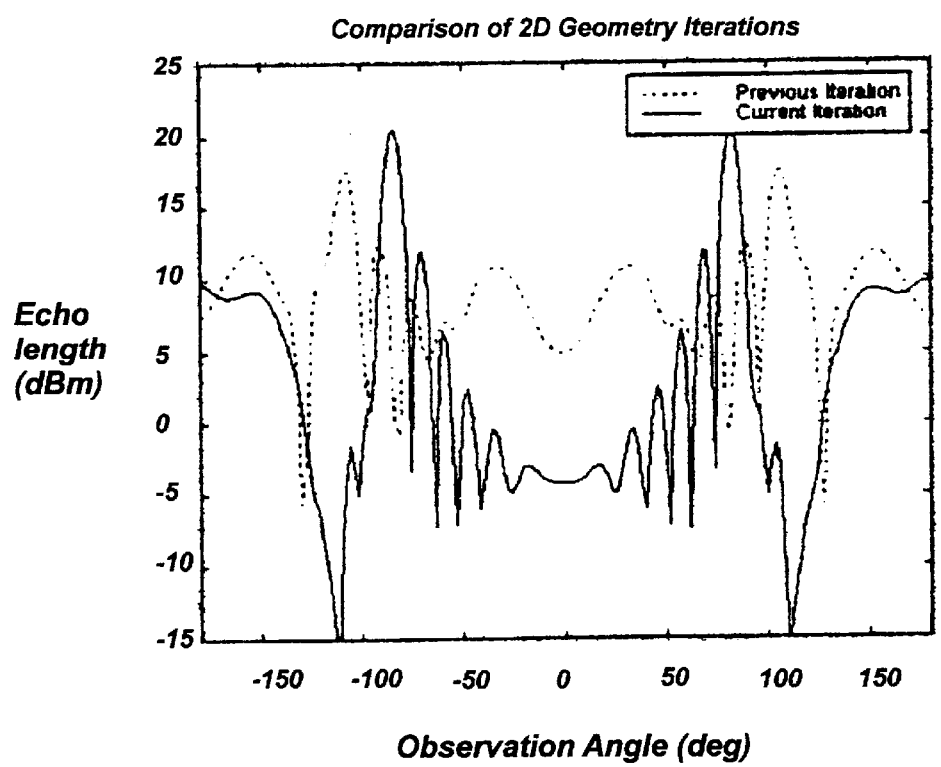
FIGS. 5a through 5c depict echo length corresponding to the optimizations of FIGS. 4a through 4c.
Figure 5B:
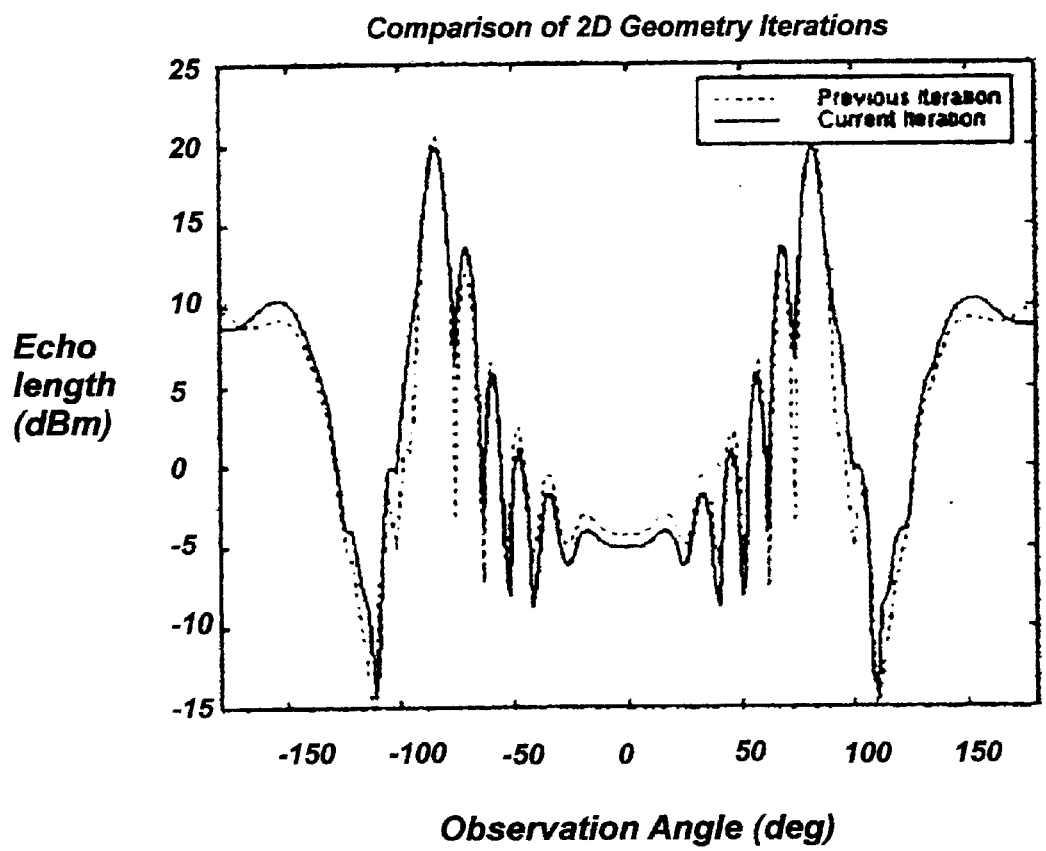
Figure 5C:
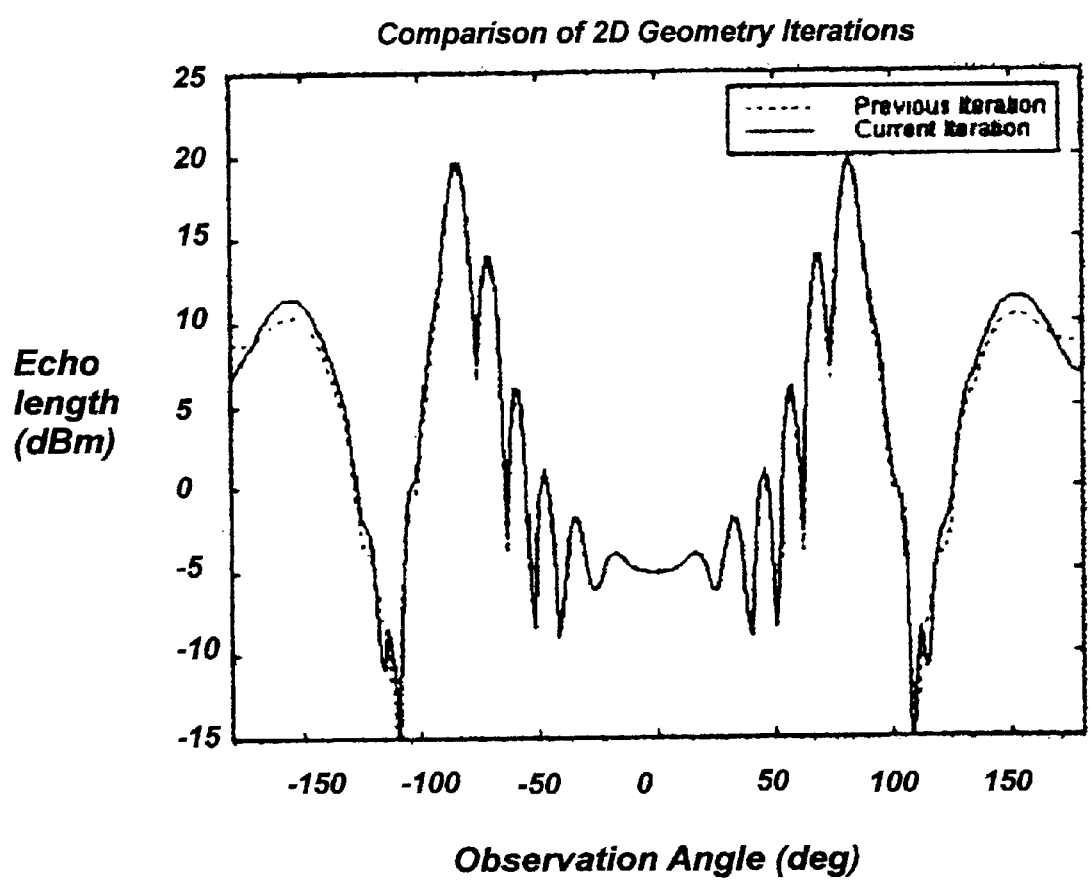

The advantage of CoV for the analysis of these problems should be clear by this point. Euler's equation offers the ability to locate local extrema quickly and accurately. When combined in this fashion to form a minimizing sequence, the analysis affords a broad search of all possible coefficient values to ultimately arrive at the global minimum. What remains is to study the effects of coefficient granularity in the application of these solutions. Studies so far have not shown that a single solution will arise out of every iterative approach. Certainly, genetic algorithms and other acceptable search schemes are applicable to this problem as well. A block diagram of the overall iterative scheme is depicted in FIG. 3.

Example of Cartesian Domain Processing

The following example shows results from this technique during a typical run on a model order of 4. Note the boundary boxes in the figures. These are physical constraints placed on the geometry (a "can't be larger than" box on the outside and a "cannot be smaller than" box on the inside). The derived shape in this example is optimized for a single frequency and angle, where the shape is dictated during optimization by the model order and choice of basis functions. For this particular case, the routine obtains a fairly wide-well solution, but is limited in depth. The theoretical limit ($-\infty$ at a single angle/single frequency) is not obtained, however. This limit would be more easily approached for higher model orders. What is particularly interesting about the final iteration of the shaping approach here is that it does not approach the inner boundary. Often, minimization approaches will tend to iterate closely to the limiting contour, but in this case additional space is provided for the boundary box.

Polar Format Design Equations

Assume that a two-dimensional geometry may be defined in the polar domain by $r(\theta)$ for $\theta = 0$ to $\theta_{max}$. Assume further that we desire the geometry to be symmetric such that $\{\tilde{r}(\theta) \in [2\pi, -\theta_{max}]\} = \{r(\theta) \in [0, \theta_{max}]\}$, where $\tilde{r}$ represents the symmetric side. With this assumption in mind, we can rewrite (1) as $$E_z^s(\rho) = \frac{\omega\mu_0}{4}\int_S J_z^s[r(\theta)]H_0^{(2)}(k[\rho - r(\theta)\cos(\theta-\theta_0)])\sqrt{r^2(\theta)+\dot{r}^2(\theta)}\,d\theta, \quad (42)$$

where $$\dot{r}(\theta) = \frac{d}{d\theta}r(\theta),$$

$\theta_0$ is the angle of observation, $\rho \to \infty$, and S is the surface represented by the symmetric geometry above. From here on, the notation $r(\theta)$ will be dropped for simply r. Now, Euler's equation becomes $$F_r - \frac{d}{d\theta}F_{\dot{r}} = 0. \quad (43)$$

First, incorporate the large argument approximation for the Hankel function $$H_0^{(2)}(k[\rho - r\cos(\theta-\theta_0)]) = \quad (44)$$

$$\sqrt{\frac{2j}{k\pi[\rho - r\cos(\theta-\theta_0)]}}\exp[-jk[\rho - r\cos(\theta-\theta_0)]]$$

for $\rho \to \infty$.
Next, write $$E_z^s(\rho) = M[r] = k_0 \int_S F(\theta, r, \dot{r})\,d\theta, \quad (45)$$

and for convenience write, $$F(\theta,r,\dot{r}) = J_z^s A(\theta,r)B(\theta,r,\dot{r}),\text{where} \quad (46)$$

$$k_0 \equiv \frac{\omega\mu_0}{4}\sqrt{\frac{2j}{k\pi\rho}}\exp[-jk\rho]$$

$$A(\theta,r) \equiv \exp[jkr\cos(\theta-\theta_0)]$$

$$B(\theta,r,\dot{r}) \equiv \sqrt{r^2+\dot{r}^2}$$

The optimization can now be more compactly described. Begin by finding $$F_r = (J_z^s)_r AB + J_z^s A_r B + J_z^s A B_r, \text{ and} \quad (47)$$

$F_{\dot{r}} = J_z^s A B_{\dot{r}}$, such that $$\frac{d}{d\theta}F_{\dot{r}} = AB_{\dot{r}}\frac{d}{d\theta}J_z^s + J_z^s B_{\dot{r}}\frac{d}{d\theta}A + J_z^s A\frac{d}{d\theta}B_{\dot{r}}.$$

Now one can calculate, $$A_r = jk\cos(\theta-\theta_0)A, \text{ and} \quad (48)$$

$$B_r = \frac{r}{\sqrt{r^2+\dot{r}^2}} = \frac{r}{B}, \text{ such that} \quad (49)$$

-continued $$F_r = \frac{A}{B}\left(B^2\frac{\partial}{\partial r}J_z^s + jk\cos(\theta-\theta_0)B^2 J_z^s + r J_z^s\right). \quad (50)$$

In a similar fashion, it is straightforward to calculate, $$\frac{d}{d\theta}J_z^s = \dot{r}\frac{\partial}{\partial r}J_z^s, \quad (51)$$

$$\frac{d}{d\theta}A = jk[\dot{r}\cos(\theta-\theta_0) - r\sin(\theta-\theta_0)]A, \text{ and} \quad (52)$$

$$B_{\dot{r}} = \frac{\dot{r}}{\sqrt{r^2+\dot{r}^2}} = \frac{\dot{r}}{B}, \text{ such that} \quad (53)$$

$$\frac{d}{d\theta}B_{\dot{r}} = \frac{\ddot{r}r^2 - r\dot{r}^2}{B^3}, \text{ and} \quad (54)$$

$$\frac{d}{d\theta}F_{\dot{r}} = $$
$$\frac{A}{B}\left(\dot{r}^2\frac{\partial}{\partial r}J_z^s + jk[r\dot{r}\cos(\theta-\theta_0) - \dot{r}^2\sin(\theta-\theta_0)]J_z^s + \frac{\ddot{r}r^2 - r\dot{r}^2}{B^2}J_z^s\right).$$

At this point, the Euler equation can now be calculated as $$F_r - \frac{d}{d\theta}F_{\dot{r}} = \quad (55)$$

$$\frac{A}{B}\left(r^2\frac{\partial}{\partial r}J_z^s + jk[(r^2+\dot{r}^2-r\dot{r})\cos(\theta-\theta_0) + \dot{r}^2\sin(\theta-\theta_0)]J_z^s + \right.$$

$$\left.\frac{r^3 + 2r\dot{r}^2 - \ddot{r}r^2}{r^2+\dot{r}^2}J_z^s\right)$$

Finally, the design equation for minimization reduces to $$\left|r^2\frac{\partial}{\partial r}J_z^s + jDJ_z^s + EJ_z^s\right| \to 0, \text{ for}$$

$$D = k[(r^2+\dot{r}^2-r\dot{r})\cos(\theta-\theta_0) + \dot{r}^2\sin(\theta-\theta_0)], \text{ and} \quad (56)$$

$$E = \frac{r^3 + 2r\dot{r}^2 - \ddot{r}r^2}{r^2+\dot{r}^2}.$$

Example of Polar Domain Processing

The following example shows results from this technique during an ideal run. In general, the polar domain processing approach was far more sensitive in its ability to arrive at a successful result. The derived shape in this example is optimized for a single frequency and angle, which explains the awkward appearance. Essentially, the routine is attempting to develop competing scatterers on the fore and aft of the target thereby causing cancellation. For this successful run, the theoretical limit of $-\infty$ is approached at 0° (off the fore end of the structure).

Extensibility of the Technique

In order to apply this technique to three dimensions, a modified version of the Euler equation may be used in two dimensions. In effect, the Euler equation of equation (3) is expanded according to $$f_u - \frac{\partial}{\partial x} f_{u_x} - \frac{\partial}{\partial y} f_{u_y} = 0, \quad (57)$$

for a integral equation defined according to $$M[u] = \int\int_D f(x, y, u, u_x, u_y) dx dy, \quad (58)$$

where x and y are the variates. The method is extensible to an arbitrary number of independent variables. The minimization that would arise from this equation would be directly analogous to its two dimensional counterpart.

It is also desirable to perform the optimization over a broad range of angles and frequencies in some cases. This is performed by creating another set of optimization equations at selected angles and frequencies of observation. The minimization according to equations (27) and (56) is then accomplished for each of those selected angles and frequencies (e.g., angles could be every 1° along the well or at 5 strategic locations throughout the well, frequencies could be similarly chosen). To accomplish this correctly, the user must remember that the surface current will change with observation angle and frequency as well, in effect making $$J_z^x = J_z^x(r, k, \theta_0). \quad (59)$$

Some costing function scheme would have to be applied to cause a successful minimization. The total number of equations that would have to be minimized in a three dimensional optimization would be identical to the number of equations requiring minimization in two dimensions {(#frequencies)× (#angles)}.

REFERENCES

1. Akheizer, Naum I (translation from the Russian by Aline H. Frink). *Calculus of Variations*, Blaisdell Publishing Company, New York/London, 1962.
2. Balanis, Constantine A. *Advanced Engineering Electromagnetics*, John Wiley & Sons, New York, 1989.
3. Skinner, Dr Paul. "AFIT Notes from Course #EE630 Part II", November 1991.

I claim:

1. A method of shaping a surface for reduced radar signature, comprising the steps of:

a) calculating surface current in accordance with the radiation integral;

b) minimizing the radiation integral using the calculus of variations;

c) determining the shape associated with the minimization; and d) creating a body incorporating the shape.

2. The method of claim 1, wherein steps a) through c) are iterated to achieve a more global minimization.

3. The method of claim 1, wherein steps a) through c) are carried out in two or three dimensions.

4. The method of claim 1, wherein steps a) through c) are carried out in Cartesian or Polar coordinates.

5. The method of claim 1, wherein the step of determining the shape associated with the minimization includes the steps of:

e) establishing a parameter space; and f) determining parametric bounds within the space.

6. A method of shaping a surface for reduced radar signature, comprising the steps of:

a) calculating surface current in accordance with the radiation integral;

b) minimizing the radiation integral using the calculus of variations;

c) determining if the shape associated with the minimization is properly bounded; and, if so, repeating steps b) and c) to improve the minimization, and d) creating a body incorporating the shape.

7. The method of claim 6, wherein:

step c) includes establishing a parameter space and parametric bounds; and, if the minimization is not properly bounded, selecting alternative parameters until an acceptable bounding is achieved.

8. The method of claim 6, wherein steps a) through c) are carried out in two or three dimensions.

9. The method of claim 6, wherein steps a) through c) are carried out in Cartesian or Polar coordinates.

* * * * *

UNITED STATES PATENT AND TRADEMARK OFFICE
CERTIFICATE OF CORRECTION

PATENT NO.    : 6,417,795 B1                                              Page 1 of 1
DATED         : July 9, 2002
INVENTOR(S)   : Brian E. Fischer It is certified that error appears in the above-identified patent and that said Letters Patent is hereby corrected as shown below:

Column 1,
Line 62, after "cross" delete ".".

Column 2,
Line 19, after "at" delete ".".

Column 6,
Line 67, replace "$\geqq$" with -- $\geq$ --.

Column 7,
Line 43, replace "$\leqq$" with -- $\leq$ --.

Column 8,
Line 14, replace "6" with -- 8 --.

Column 11,
Line 26, replace   "$J^x_z = J^x_z(r, k, \Theta o)$" with -- $J^s_z = J^s_z(r, k, \Theta o)$ --.

Column 12,
Lines 39 and 41, replace "6" with -- 1 --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,417,795 B1
DATED : July 9, 2002
INVENTOR(S) : Brian E. Fischer

It is certified that error appears in the above-identified patent and that said Letters Patent is hereby corrected as shown below:

Column 12,
Lines 39 and 41, "6" (as deleted by Certificate of Correction issued March 18, 2003) should be reinstated.

Signed and Sealed this

Twenty-seventh Day of September, 2005

JON W. DUDAS
*Director of the United States Patent and Trademark Office*